Figure 1:
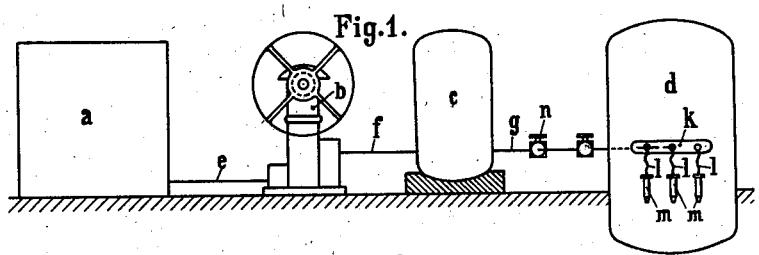

Oct. 20, 1925.  1,557,779
G. SCHEIB
PROCESS AND APPARATUS FOR THE PRESERVATION OF OBJECTS
OF ANIMAL ORIGIN (MEAT, FOWL, FISH, ETC.)
Filed Sept. 25, 1920   3 Sheets-Sheet 1

Inventor:
Georg Scheib,
by W. Schwanbom
Attorney.

Oct. 20, 1925.
G. SCHEIB
1,557,779
PROCESS AND APPARATUS FOR THE PRESERVATION OF OBJECTS
OF ANIMAL ORIGIN (MEAT, FOWL, FISH, ETC.)
Filed Sept. 25, 1920   3 Sheets-Sheet 2
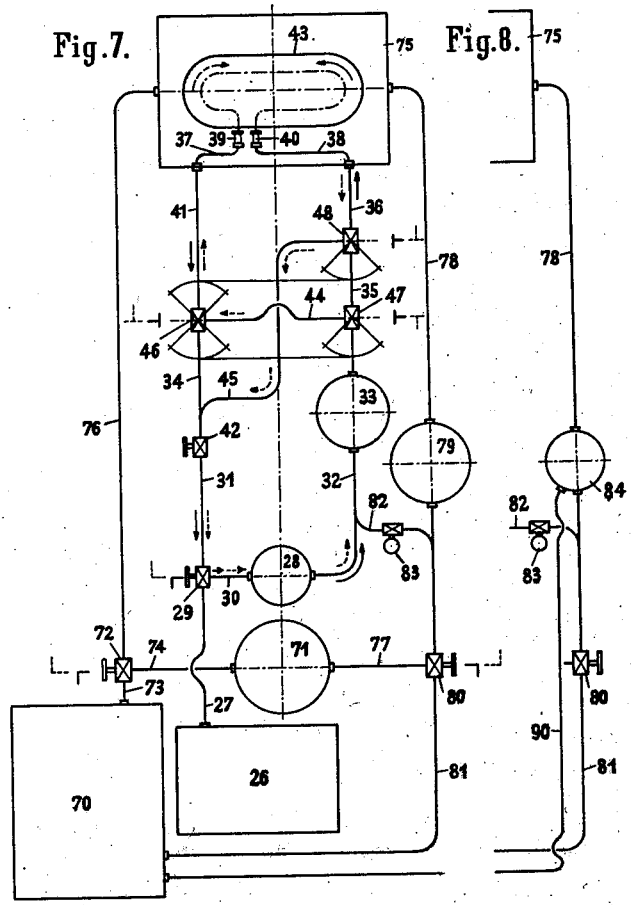
Inventor:
Georg Scheib.
by W. Schoanborn
Attorney Oct. 20, 1925.　　　　　　　　　　　　　1,557,779
G. SCHEIB
PROCESS AND APPARATUS FOR THE PRESERVATION OF OBJECTS
OF ANIMAL ORIGIN (MEAT, FOWL, FISH, ETC.)
Filed Sept. 25, 1920　　　3 Sheets-Sheet 3

Inventor:
Georg Scheib.
by W. Gehrenborn,
Attorney.

Patented Oct. 20, 1925.

1,557,779

UNITED STATES PATENT OFFICE.

GEORG SCHEIB, OF BERLIN, GERMANY, ASSIGNOR OF ONE-FOURTH TO HANS GUNTHERBERG, ONE-FOURTH TO RICHARD IHLENFELDT, AND ONE-FOURTH TO MAX KOCH, ALL OF BERLIN, GERMANY.

PROCESS AND APPARATUS FOR THE PRESERVATION OF OBJECTS OF ANIMAL ORIGIN (MEAT, FOWL, FISH, ETC.).

Application filed September 25, 1920. Serial No. 412,888.

*To all whom it may concern:*

Be it known that I, GEORG SCHEIB, a citizen of the German Empire, residing at Berlin, in the German Empire, have invented certain new and useful improvements in processes and apparatus for the preservation of objects of animal origin (meat, fowl, fish, etc.) either entire carcasses or portions thereof, of which the following is a specification.

It is a known feature, when preserving meat, fowl, fish, corpses and such like that the preserving substance is forced into the blood vessels in a manner imitating the pulsations of the aorta or that it is introduced into the tissues by means of nozzles; it has moreover been suggested to subject the meat to the action of the preserving liquid from outside to inwards under oscillating pressure.

The known processes of the first kind do not permit of the application of such high pressure as is required for the penetration of the whole of the tissues by the preserving liquid, in order to obtain completely reliable preservation. The degree of pressure that can be attained with this process, when imitating the circulation of the blood, is dependent on the degree of inner resistance presented by the net-work of the blood vessels. If the preserving substance is forced into the tissues, then the degree of pressure permissible is limited by the power of resistance of the cells, which will rend and tear under a certain degree of pressure, rendering impossible any further increase of pressure. The processes of the second kind are still less able to attain to complete penetration of the cell-tissues, for the cells will close under outside pressure; the variations of pressure employed in the latter case, and performed in the method known hitherto, have not brought any success either, for they are much too slow, the intervals required being much too long.

The process forming the subject of the present invention for the preservation of substances of animal origin (meat, fowl, fish and so forth), either of the whole carcass or parts thereof, consists therein that a liquid or gaseous preserving substance is forced into the interior of the object to be preserved at any place desired and under a pressure of any desired strength, either oscillating or constant, and quite independent of the resistance of the blood vessels and of the cells and that at the same time a constant or an oscillating pressure of a liquid or of a gas is exercised from outside the object to be preserved. The preservative substance may be pressed with whole carcasses into one end of a severed main artery and after flowing through the carcass again led away from the other end of the main artery, the pressure being kept constant by throttling, while at the same time a steady or oscillating liquid or gas pressure is imposed from outside on the object to be preserved.

The appliance serving for carrying out the process consists of pipe-lines, leading from a storage container to a pump, from there to an air-regulating chamber, from there on the one side to nozzles, and on the other side to a sealed treatment tank, together with safety valves in the pipe-lines leading to the nozzles and to the treatment tank, and return pipe-lines from the safety valves to the storage container and of a pressure regulator attached to the pipe-line, leading to the treatment tank.

By the application of the exterior pressure on the object to be preserved simultaneously with the internal treatment, it is possible to increase the internal pressure to any desired degree and to obtain thereby reliable and even penetration of all the cells of the object to be preserved.

The process is performed in the following manner:

The preserving liquid or any suitable gas is introduced by a pump, and with the aid of nozzles or similar devices, into the inside, if possible right into the centre of the meat from any desired exterior spot, under constant or pulsating pressure. At the same time exterior counter pressure is brought to bear on the object to be preserved and contained in a vessel which can be sealed; the pressure may be either constant (for small pieces of meat or small animal carcasses), or oscillating (for large pieces or animal carcasses). The constant counter pressure applied must be equal or slightly less than the internal pressure, in order to make possible complete penetration of the cells, and that from inside to the exterior of the substance to be preserved, only traces of the preserving substance can exude on the surface. The limits of the oscillating counter-pressure must be selected in such a manner that the upward variations will be slightly higher than the internal pressure, and that the downward variations will permit traces only of the preserving substance to appear on the surface of the object to be preserved. In a second form of execution of my new process preservative liquid or a suitable gas is introduced by a pump into one end of a severed main artery of the animal to be treated, under steady or oscillating pressure, makes its way through the body in a manner corresponding to the circulation of the blood, again passes out of the body at the other end of the severed main artery and returns from there to the pump. The path of the preservative substance through the body may be in the direction of the natural circulation of the blood, in the opposite direction or in a periodically reversed direction; the motion in opposition to the natural circulation is rendered possible by the fact that owing to the high pressure of the preservative substance the valves situated in the heart and in the veins are torn or so far deformed that they no longer close tightly. Nothing is altered in the employment of the external pressure.

The preserving substances to be employed with the internal application may be either liquid or gaseous; of liquid preserving substances, muriatic acid, peroxide of hydrogen or such like (in the proportion of 2 to 4 volumes to 1000 volumes of water) and of gaseous preserving substances carbonic acid gas, nitrogen or such like, may be used for the preservation of meat, and solutions of arsenic, boric acid, glycerine and formaline for the preservation of human corpses and of the dead bodies of animals.

For producing the external counter-pressure, next to the preserving substances mentioned for the internal treatment, water or air free from germs may be applied. The employment of a liquid under pressure of gas is also permissible.

For the inner pressure, in case of small-sized animals (fish or young fowl) between 5 and 10 kg. per square centimetre should be selected, and for animals of larger size (cattle and older animals) about 10 to 15 kg. or more per square centimetre. In the case of the oscillating internal pressure, the variations 10 to 20%, their mean value is equal to the value of the constant pressure. The constant external pressure (for small animals) is either equal to the inner pressure selected in each case (5 to 10 kg.) per square centimetre or less by about 10%.

The oscillating external counter pressure must be maintained equal in its mean value to the inner pressure selected for each individual case (10 to 15 kg. per square centimetre or more), the variations of the oscillating external counter-pressure must be equal upwards and downwards to about 10 to 20% each, of the mean value selected for the oscillating external counter-pressure. The liquid or such like surrounding the object to be preserved, serves solely for the purpose of surrounding it, as it were, with a more or less elastic mantle in close touch with it on the whole of the surface, which on the one hand prevents the rending of the cells by means of the internal forces raised, and which on the other hand, closes up the exterior cells, in the case of portions of animals, also closing the arteries or vessels separated, even the large ones, by its external pressure.

The oscillating motion of the internal pressure shall imitate the pulsating action of the blood in living animals. The employment of an oscillating external pressure, together with internal treatment, is similar in its effect to oscillating kneading of the meat or such like to be preserved, whereby the forward movement of the preserving liquid or gas introduced under the pressure into the neighbouring cells is aided until all the cells right through have been evenly penetrated by the preserving substance.

Figure 2:
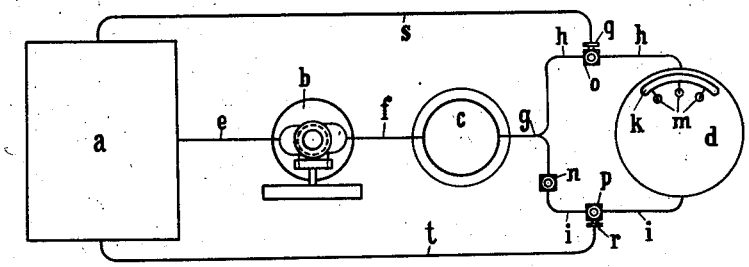
Figure 3:
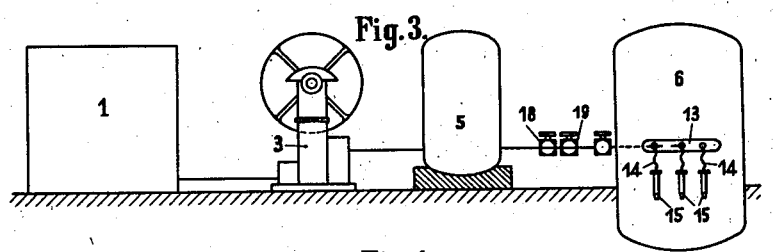
Figure 4:
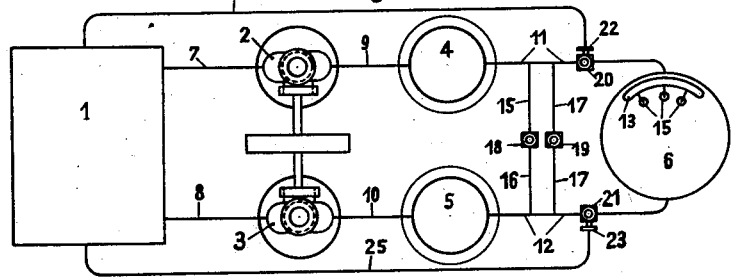
Figure 5:
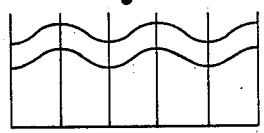
Figure 6:
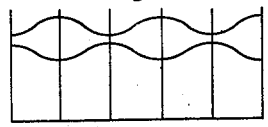

The drawing illustrates in form of a sketch three appliances suitable for carrying out the process. Figs. 1 and 2 are horizontal and vertical views of one appliance. Figs. 3 and 4 horizontal and vertical views of a second appliance. Figs. 5 and 6 are diagrams of the pressure experienced. Figs. 7 and 8 illustrate the plan of a third apparatus and Figs. 9 to 13 are details of the apparatus illustrated in Figs. 7 and 8.

The appliance in accordance with Figs. 1 and 2 consists of a storage container (*a*) for the preserving medium of a force pump (*b*), of an air regulator (*c*) and of a sealed treatment tank (*d*), the pump (*b*) is connected to the container (*a*) by means of a suction pipe line (*e*), and to the air regulator (*c*) by means of a pressure pipe-line (*f*). From the air regulator (*c*), proceeds the force pump line (*g*) divided into the two branch lines (*h*) and (*i*). Branch (*h*) leads to the distributing piece (*k*) provided for inside the sealed treatment tank (*d*), distributing piece (*k*) is fitted with nozzles (*m*) by means of the flexible pipe (*l*); the branch line (I) opens into the interior of the treatment tank (*d*). Into the branch line (*i*) there is inserted a pressure regulator (*n*) which can be of the nature of a throttle valve or of another throttle device and which next to regulating the pressure, undertakes the distribution of the preserving medium lifted by the pump between the pipe-lines (*h*) and (*i*). The pipe lines (*h*) and (*i*) are moreover provided with one safety valve (*o*) and (*p*) each, with an overflow pipe (*q*) and (*r*) each, which are connected to the container (*a*) by means of overflow pipe-lines (*s*) and (*t*).

The appliance illustrated in Figs. (1) and (2) performs in the following manner:—

Pump (*b*) takes by means of the suction pipe-line (*e*) the preserving medium from the container (*a*) and lifts it through the pressure pipe-line (*f*) into the air regulator (*c*). From here it is carried into the pressure pipe-line (*g*). One part flows through the branch line (*h*) to the distributing piece (*k*) through the flexible tubes (*l*) and the nozzles (*m*) into the interior of the object to be treated. The other part flows through branch line (*i*), having the quantity of liquid correspondingly adjusted by the pressure regulator (*n*) into the treatment tank (*d*). Any preserving medium lifted in excess by the pump (*b*) leaves the pipe line by the safety valves (*o*) and (*p*) and flows through the overflow pipe lines (*s*) and (*t*) back into the container (*a*).

The appliance illustrated in Figs. 1 and 2 can be employed next to the constant external and the internal pressure, without any further trouble for working with varied pressures for the internal and external treatment, whereby the number of pressure variations is dependent only on the number of strokes of the pump, and the extent of the variations in pressure in the relation of the pump-volume to the amount of air or gas contained in the air regulator.

When using only one single effect pump, there is no variation in the cycle of the variations of pressure for the internal and external treatment; therefore there are apparent inside and outside the greatest variations of pressure upwards, and largest variations of pressure downwards, always simultaneously; between internal and external pressure, there is always prevalent an uninterrupted nearly constant variation of pressure, determined by the pressure regulator (*n*) as is shown by Fig. 5; in Fig. 5, the pressures are registered as ordinates and the pump strokes or phases as abscissas; the upper curve, illustrates the internal pressure and the lower one the external pressure.

The appliance in accordance with Figs. 3 and 4, is provided with two force pumps and two air regulators. (1) is the container for the preserving medium, 2 and 3 are the two force pumps, 4 and 5 are the two air regulators, 6 is the treatment tank; 7 and 8 are the suction pipe lines, 9 and 10 are the pressure pipe-lines between the pumps 2 and 3, and the air regulators 4 and 5. 11 and 12 are the pressure pipe-lines starting from the air regulators 4 and 5. The pressure pipe-line 11 is attached to the distributing piece 13 and is provided with the nozzles 15 and the flexible tubes 14 inside of tank 6; the pressure pipe-line 12 leads directly into the interior of the container 6. Between the pressure pipe-lines 11 and 12, there are inserted two connecting pipe lines 16 and 17, which are provided with a pressure regulator 18 and 19 each both of them actuate, next to the adjustment of the pressure, at the same time, the distribution of the preserving medium lifted by the pumps 2 and 3, into the pressure pipe-lines 11 and 12. 20 and 21 are safety valves for the two pressure pipe-lines 11 and 12; 22 and 23 are overflow pipes of the safety valves mentioned above, to which are connected the overflow pipe-lines 24 and 25 to the container 1.

The appliance illustrated in Figs. 3 and 4 performs in the following manner:—

The system of pumps takes, with the aid of suction pipe-line 7 and of pump 2, the preserving medium from container 1 and carries it through the pressure pipe-line 9, air regulator 4, and pressure pipe-line 11, to the distributing piece 13 in the treatment tank 6; from here it is carried through the flexible tubes 14 to the nozzles 15, from which it enters into the interior of the object to be treated; the other system of pumps lifts from container 1, by means of suction pipe-line 8 and pump 3 and also the pressure pipe-line 10, to the air regulator 5, from here further through the pressure pipe-line 12, attached to the air regulator 5, direct into the treatment tank 6. The pressure regulators 18 and 19, installed in the connecting pipe-line 16 and 17 of the pressure pipe-lines 11 and 12, permit of the adjustment of the differences in pressure required by the internal and the external treatment, and they regulate at the same time the quantities to flow through corresponding to the pipe-lines 11 and 12. The pressure regulator 18 starts working if there is too high a pressure in the pipe-line 12, and the pressure regulator 19, if there is too low a pressure in the pipe-line 12.

The safety valve 20 and 21 pass any excess of liquid which may have been supplied by pumps 2, and 3 through the overflow pipes 22 and 23 into the overflow pipes 24 and 25, which return the excess back to container 1.

The appliance illustrated in Figs. 3 and 4 can find application for constant internal and external pressure, as well as for constant pressure outside and variable pressure inside, and reversed, and also furthermore for variable internal and external pressure, with and without variations in the cycle of the pressure variations. The varying pressure with and without variations of the cycle can be obtained by corresponding coupling of the pumps 2 and 3. For instance, if the two pumps are single effect pumps and if their cranks are displaced by 180°, the greatest variation of pressure upwards of the one pump system will correspond in regard to time with the greatest variation of pressure downwards of the other pump system, and reverse, as can be seen from Fig. 6; if the cranks of the two pumps are not displaced against one another the pressure condition will be in accordance with Fig. 5.

In place of the two single effect pumps with cranks displaced by 180°, a double effect pump can be used, whereby one pressure valve each must be attached to the two air regulators.

The pressure regulators 18 and 19 should be adjusted in such a manner that they permit of the variations required. The appliance shown in Figs. 7 and 8 serves for carrying out the form of process in which preservative substance is lead in a circle through the veins of the carcass. The portion serving for the exercise of the internal pressure consists of the storage receptacle 26 for preservative substance, of the connecting piping 27, 30 with the compression pump 28, of the 2-way cock 29, which last in one position opens the way from the receptacle 26 through the suction pipe 30 to the pump 28 and in the other position connects the pump 28 with a return pipe 31. The pump 28 has a speed of revolution adjustable in wide limits during operation, as may be attained either by electric drive or by driving with conical drums or other means. The pump is connected to the pressure pipe 32 with the air chamber 33. The connecting tubes 34, 41 for the suction pipe and 35 and 36 for the pressure pipe, from the connection with the hose pipes 37 and 38, which last carry at their ends the junction pieces 39 and 40 for the main arteries. In the return pipe 34 is introduced a throttle valve 42.

The portions of the apparatus according to Figure 7 which serve for the exercise of the external pressure are: a second receptacle 70, a compression pump 71 with 2-way cock 72, which in one position connects the pump 71 with the receptacle 70 through the pipes 73, 74, and in the other position connects the suction space of the pump 71 with the receptacle 75 through the pipes 76; also the pressure piping 77, 78, the latter with air chamber 79, 2-way cock 80, return pressure pipe 81 and equalizing pipe 82 with pressure regulator 83.

The necessary fittings such as manometer, relief cock safety valves and the like must be provided. The suction piping 76, 74, with correct adjustment of the 2-way cock 72 and with the help of the pipe 81, allows of the emptying of the receptacle 75 into the receptacle 70, correct adjustment of the 2-way cock 80 being presumed.

For the attainment of the desired temperature the receptacles 26, 70 and 75 are furnished with heating coils.

According to the position of the cock 29 the pump 28 takes its charge either from the receptacle 26 or from the return pipe 31, presses it through the pressure piping 32, 35, 36 into the hose pipe 38 with the junction piece 40 for the one end of the severed main artery, from there through the body to be preserved in the direction of the greater and lesser blood circulation to the other end of the severed main artery, which last is in connection with the return piping 34, 31 through the junction piece 39 hose pipe 37 and tube 41, or through 30 with the suction space of the compression pump 28. By appropriate adjustment of the throttle valve 42, and correct selection of the volume of preservative substance to be withdrawn from the receptacle 26, any desired pressure may be obtained in the interior of the body to be preserved and in the pressure and return piping. For a desired direction of circulation from left to right or vice versa the appropriate end of the main arteries must be connected to the appropriate junction piece 39, 40. With appropriate adjustment of the 2-way cock 72 the pump 71 takes its charge from the receptacle 70 through the pipe 74, and then presses the preservative substance through the piping 77, 78 with appropriate adjustment of the 2-way cock 80, into the receptacle 75 until the pressure desired is here attained, the pump 71 can then be stopped. Any falling of the external pressure may be stopped by increasing the internal pressure by the help of raising the speed of revolution of the pump 28, in consequence of which the pressure regulator 83, adjusted to the internal pressure, allows preservative substance to pass into the pressure pipe 78 of the external pressure and into the receptacle 75, until the right pressure is there obtained.

The apparatus for carrying out the circulation through the veins of the carcass being treated with variation of direction from left to right or vice versa in periods as short as may be desired is also contained in Figure 7. Figs. 9 to 12 show details. For the operation with variation of direction there are provided: an auxiliary pressure pipe 44, an auxiliary suction pipe 45, three 3-way cocks 46, 47 and 48, which are coupled together in accordance with Figure 9 and are reversed by means of the reversing apparatus illustrated in Figs. 9 to 12 by the pump shaft by means of spur wheels, tappets or rolls, in such a manner that the direction of the circulation is automatically altered at any desired intervals depending on the speed of revolution of the pump shaft and on the reversing drive.

The circulation in the direction from left to right is indicated in Figure 7 by the full arrows and cock positions. The pump 28 takes the preservative substance from the receptacle 26 or the return piping 31, 34, 41, presses it through the pressure piping 32, 35, 36, the hose pipe 38, the junction piece 40 connected therewith, through the body 43 to the junction piece 39 connected with 37, then further through the piping 41, 34 to the throttle valve 42, and then again sucks in preservative substance through 31, 30 or the receptacle 26. After the automatic reversal of the cocks 46, 47 and 48, effected by means of the reversing apparatus, the circulation begins from right to left as is demonstrated by the dotted arrows and cock positions. That is to say the pump pressed the preservative substance through 32, 44, 41 and 37 with the junction piece 39 belonging thereto, through the body 43, to the junction piece 40 attached to 38, and from there further through 36, 45 and 34 to the throttle valve 42, whence it again passes through 31 and 30 to the suction space of the pump 28.

Figure 9:
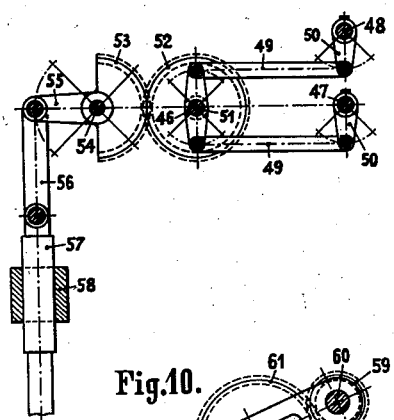

Figure 9 shows the coupling of the 3-way cocks 46, 47 and 48 by the help of the levers 50 and links 49. The lengthened spindle 51 of the cock 46 carries a spur-wheel 52, which is in mesh with a toothed segment 53. On the rotatably mounted spindle 54 of the toothed segment is fixed the lever 55 which receives its motion from the reversing mechanism illustrated in Figs. 10 and 11 or 12, by the help of the link 56, transmission piece 57 and guide 58. The reversing gear itself consists in accordance with Figs. 10, 11 and 12 of a reversing drive with spur-wheel 59 on the pump shaft 60, a wheel 61 in the quadrant 62, and a wheel 63 mounted on the actual reversing shaft 64. The quadrant 62 is mounted rotatably on the pump but at the same time in such a way that it may be fixed, so that for the attainment of different transmissions between the pump shaft 60 and the reversing shaft 64, it is only necessary to interchange the wheels 59 and 61. The spur-wheel 63 carries a roll 65, rotatable about a pin, which works a tappet 66 rotatable in a fixed holder. The two tappets 66 are formed as levers and transmit their motion to the transmission rod 57 by means of the link 67 with a pin. During one revolution of the spur-wheel 63 the transmission rod 57 receives two movements by means of which, with appropriate lever transmission, the cocks 46, 47 and 48 are so worked that the alteration in the direction of the circulation is thereby evoked.

Figure 12:
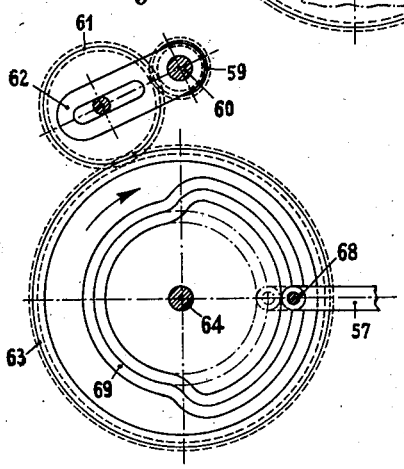

Figure 12 shows a second reversing drive by means of a roll 68 and cam disc 69 which is screwed to the spur-wheel 63. The roll receives its motion from the groove in the cam disc 69 and passes it on to the transmission rod 57, so that during one revolution the cam disc also gives rise to two movements of the 3-way cocks 46, 47 and 48, and hence to two alterations in the direction of the circulation.

Figure 10:
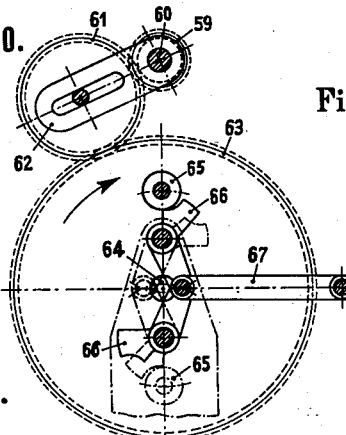
Figure 11:
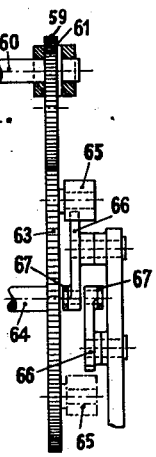

The arrangement of the reversing drive and of the coupling mechanism is the same for Figs. 10, 11 and 12.

Figure 13:
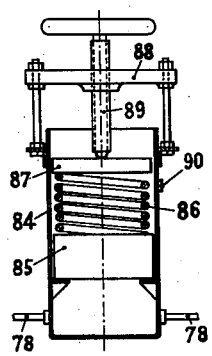

The apparatus according to Figure 8 for working with oscillating external pressure differs from the apparatus according to Figure 7 for working with steady external pressure in the fact that the air chamber 79 is, for the purpose of producing the oscillation of the external pressure, replaced by a receptacle 84 with a spring-loaded piston as shown in Figure 13. In the cylindrical receptacle 84 is fitted the piston 85, so as to close tightly. It is loaded by the spring 86. A tension device for the spring is formed by the spring plate 87, the traverse 88 with screw thread, the latter fixed by means of holders to the housing 84, and the screw-spindle 89 with hand wheel. With a definite adjustment of the tension of the spring by means of the tension device, the spring 86 suffers through the piston 85 a certain compression at each stroke of the pump, and this is, for the contents of the pressure piping 77, 78 and of the receptacle 75, equivalent to an increase of pressure at each stroke of the pump. The amount of this increase of pressure at each stroke of the pump may be kept within the desired limits by adjusting the spring. The number of increases of pressure per unit of time depends on the speed of revolution of the pump 71 and is controlled by adjustment of the speed of revolution of the pump 71. Any preservative substance which, owing to lack of tightness on the part of the piston 85, may have passed into the spring space can flow back into the receptacle 70 through the pipe 90 (Figs. 8 and 13) so that the free movement of the piston is not interfered with. In working with oscillating counter-pressure the 2-way cock 72 must open the connection between 76 and 74. While applicant has restricted his apparatus claims to that shown in Figures 1 and 2, the structures shown in Figures 3, 4, 7 and 8 will be made the subject-matter of separate and divisional applications in due time.

I claim—

1. A process for the preservation of objects of animal origin (meat, fowl, fish, etc.) either entire carcasses or portions thereof consisting in forcing a liquid or gaseous preservative substance into the interior of the object to be preserved at any desired spot, under pressure of any desired degree which may be regulated, and imposing at the same time pressure from outside on the object to be preserved.

2. A process for the preservation of objects of animal origin (meat, fowl, fish, etc.) either entire carcasses or portions thereof consisting in forcing a liquid or gaseous preservative substance into the interior of the object to be preserved at any desired spot, under pressure of any desired degree which may be regulated, of oscillating nature and imposing at the same time pressure from outside on the object to be preserved.

3. A process for the preservation of objects of animal origin (meat, fowl, fish, etc.) either entire carcasses or portions thereof consisting in forcing a liquid or gaseous preservative substance into the interior of the object to be preserved at any desired spot, under pressure of any desired degree which may be regulated, and imposing at the same time oscillating pressure from outside on the object to be preserved.

4. A process for the preservation of objects of animal origin (meat, fowl, fish, etc.) either entire carcasses or portions thereof consisting in forcing a liquid or gaseous preservative substance into the interior of the object to be preserved at any desired spot, under pressure of any desired degree which may be regulated, of oscillating nature and imposing at the same time oscillating pressure from outside on the object to be preserved.

5. A process for the preservation of objects of animal origin (meat, fowl, fish, etc.) in whole carcasses consisting in forcing a liquid or gaseous preservative substance under pressure of any desired degree into one end of a severed main artery and after flowing through the carcass leading it again away from the other end of said severed main artery, the pressure being regulated by throttling, and imposing at the same time pressure from outside on the object to be preserved.

6. A process for the preservation of objects of animal origin (meat, fowl, fish, etc.) in whole carcasses consisting in forcing a liquid or gaseous preservative substance under oscillating pressure of any desired degree into one end of a severed main artery and after flowing through the carcass leading it again away from the other end of said severed main artery, the pressure being regulated by throttling, and imposing at the same time pressure from outside on the object to be preserved.

7. A process for the preservation of objects of animal origin (meat, fowl, fish, etc.) in whole carcasses consisting in forcing a liquid or gaseous preservative substance under pressure of any desired degree into one end of a severed main artery and after flowing through the carcass leading it again away from the other end of said severed main artery, the pressure being regulated by throttling, and imposing at the same time oscillating pressure from outside on the object to be preserved.

8. A process for the preservation of objects of animal origin (meat, fowl, fish, etc.) in whole carcasses consisting in forcing a liquid or gaseous preservative substance under oscillating pressure of any desired degree into one end of a severed main artery and after flowing through the carcass leading it again away from the other end of said severed main artery, the pressure being regulated by throttling, and imposing at the same time oscillating pressure from outside on the object to be preserved.

9. A process for the preservation of objects of animal origin (meat, fowl, fish, etc.) in whole carcasses or portions thereof consisting in forcing a liquid or gaseous preservative substance into the interior of the object to be preserved at any spot, under constant or varying internal pressure and constant or varying exterior pressure, the limits of both said pressures being selected in such a manner that the exterior pressure is always equal or slightly less than the internal pressure.

10. Apparatus for the preservation of objects of animal origin (meat, fowl, fish, etc.) comprising a storage receptacle, a pump, an air chamber, a closed treatment tank, a plurality of nozzles in said closed treatment tank, pipe-lines leading from said storage receptacle to said pump, from said pump to said air chamber and from said air chamber to said nozzles and to said treatment tank, safety valves, inserted in said pipe-lines leading to said nozzles and to said treatment tank, return pipes from said safety valves to said storage receptacle and a pressure regulator, inserted in said pipe-line to said treatment tank.

In testimony whereof, I have signed my name to this specification.

GEORG SCHEIB.